United States Patent

[11] 3,535,992

[72] Inventors Peter C. Goldmark, and
 William E., Jr. Glenn, Stamford,
 Connecticut
[21] Appl. No. 717,682
[22] Filed April 1, 1968
[45] Patented Oct. 27, 1970
[73] Assignee Columbia Broadcasting Systems, Inc.
 New York, New York
 a corporation of New York

[54] METHOD AND APPARATUS FOR OPTICALLY RECORDING COLOR PICTURE INFORMATION ON A PHOTOGRAPHIC MEDIUM
 30 Claims, 11 Drawing Figs.
[52] U.S. Cl. ............................................... 95/12.20
[51] Int. Cl. .......................................... G03b 33/00
[50] Field of Search ........................................ 95/12.2

[56] References Cited
 UNITED STATES PATENTS
 2,164,062 6/1939 Grimson .................... 355/33

Primary Examiner—John M. Horan
Attorney—Brumbaugh, Graves, Donohue & Raymond

ABSTRACT: A method and apparatus for recording color picture information from an original scene on a photographic medium, in which a banded color filter converts an image of the original scene into a series of parallel, elongated image areas corresponding to like areas of the original scene. The areas have a given transverse spatial periodicity and are comprised of adjacent strip images of the various color components in the corresponding original scene area, formed by passing the original scene image through the banded filter. Those areas are focused by a lenticular lens array onto the image plane of the medium. Imaged in superimposed relation to the color strip images is a series of alternating, relatively contrasting areas, such as in the form of spaced parallel lines, having a constant transverse spatial periodicity which is one-half that of the periodicity of the color strip images.

To form the latter series of elongated areas, either the average light from the scene to be recorded or light from an independent source is used to form an elongated image having a transverse dimension one-half the corresponding dimension of the banded color filter. That image is projected onto the lenticular array to result in the formation of a latent image of the latter series of elongated areas (or lines) irrespective of variations in the luminance content of the original scene.

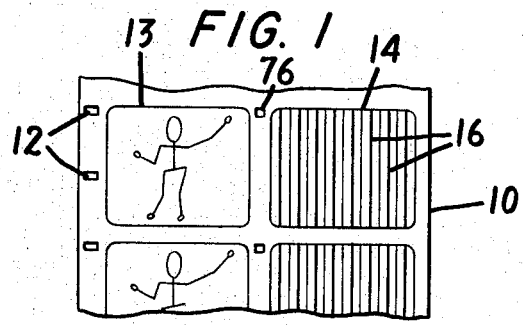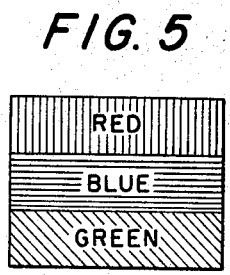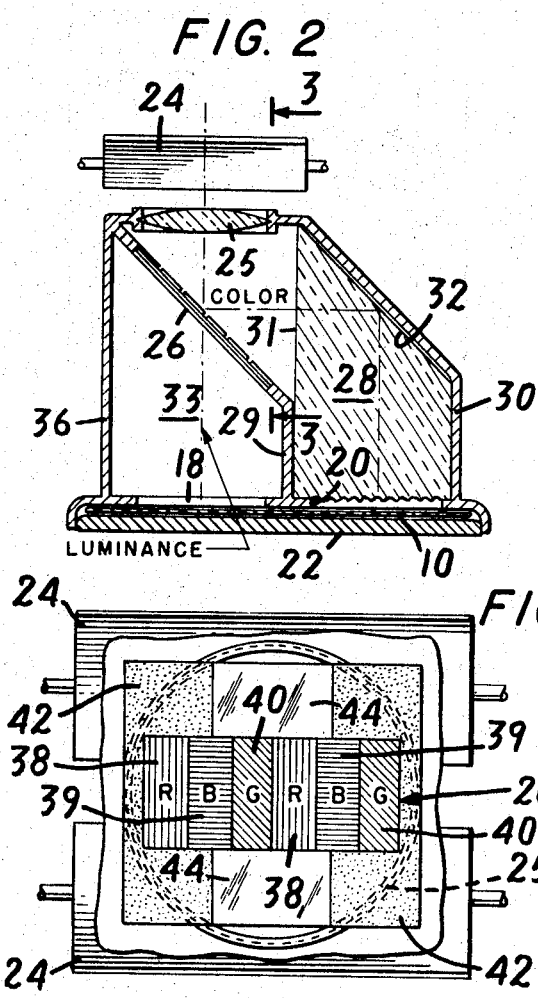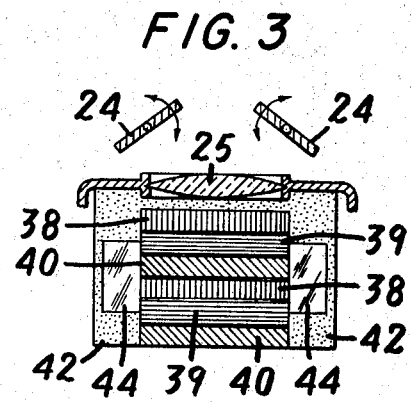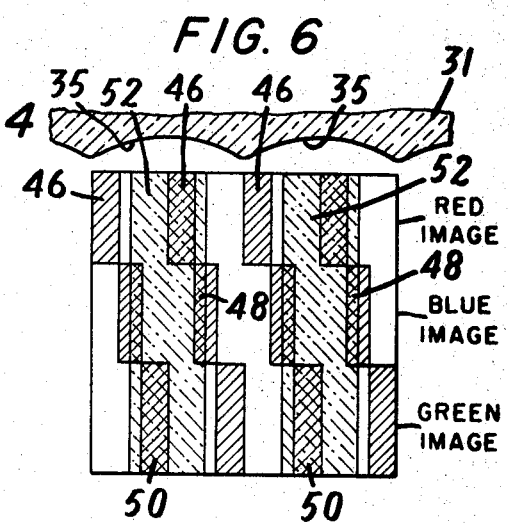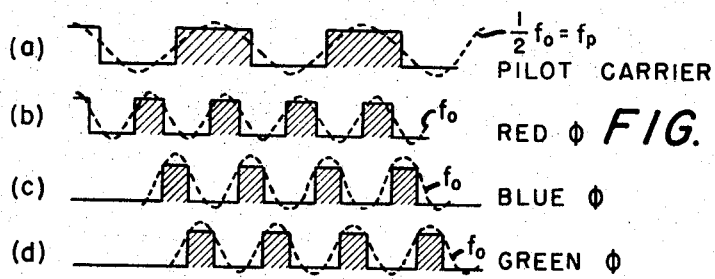

INVENTORS.
PETER C. GOLDMARK &
WILLIAM E. GLENN, JR.

their ATTORNEYS 3,535,992

METHOD AND APPARATUS FOR OPTICALLY RECORDING COLOR PICTURE INFORMATION ON A PHOTOGRAPHIC MEDIUM

BACKGROUND OF THE INVENTION

This invention relates to the optical recording of color picture information in a coded format on a photographic medium and, more particularly, to a method and apparatus for optically recording such information as superimposed records of a reference carrier signal and a phase and amplitude modulated color carrier signal at a different frequency, whereby both carriers may be reproduced by television scanning techniques to develop video color signals.

In U.S. Pat. application Ser. No. 375,469, filed June 16, 1964, now abandoned, by Goldmark and Gabor for "Color Picture Information Recording and Reproducing System" there is disclosed a technique by which color picture information may be recorded on a record medium, such as a photographic film. There, the original scene is scanned with a television camera to produce a chrominance signal—for example, the I and Q components of an NTSC color television signal. The I and Q components of the chrominance signal are used to modulate the amplitude and phase of a color carrier signal which is used to vary the intensity of a recording beam, tracing out a raster pattern on the film, according to the amplitude of the modulated color carrier signal. In addition, the recording beam is simultaneously modulated with both the luminance component of the picture and a pilot, or reference, carrier signal at a frequency which is a multiple or submultiple, and preferably one-half, of the frequency of the color carrier. Both carriers are multiples of the line-scanning rate so that the cycles of the respective pilot and color carriers tend to be aligned in a common direction in the frame, thereby tending to form series of mutually spaced lines in each film frame.

To reproduce a color television signal from the film, the film is similarly scanned to reproduce the luminance component and the modulated color carrier and pilot signals, which may be combined in a demodulator to recover the I and Q modulating components for application to a conventional television receiver. The luminance component, which is restricted to a lower bandwidth than the color carrier sidebands, is recovered by conventional filtering.

In copending U.S. Pat. application Ser. No. 519,106, filed Jan. 6, 1966, now abandoned of Goldmark et al. for "Color Film Recording and Reproducing Apparatus" the color picture information is recorded in the manner briefly outlined above, but the luminance component is separately recorded in an adjacent portion or frame of the record medium. The luminance component of the scene, as there disclosed, may be recorded either optically (i.e., photographically) or electronically.

SUMMARY OF THE INVENTION

The present invention provides a method and apparatus by which recordation of color picture information in the format described above may be accomplished entirely optically, without the need of electronic equipment. As a result, a photographic medium can be exposed with latent images in a photographic camera and, after suitable chemical processing, can be scanned to develop the pilot and modulated color carrier signals.

In brief, this is accomplished by exposing the photographic medium with an optical image of a first series of mutually spaced parallel lines, or elongated areas, having a constant transverse periodicity and converting the image of the original scene into a second series of parallel elongated image areas of which each contains at least two strips having adjacent portions providing displaced images of different color components in the corresponding area of the scene. The transverse spatial periodicity of the second series is different from the constant periodicity of the first series, and each strip within the areas of the second series has a predetermined spatial relationship with respect to the other strips in the same areas, and also with respect to the images of the first series of areas. The first series of elongated areas forms a record of the pilot carrier, whereas the second series of elongated areas forms a record of the color carrier in which each strip image within the second series of image areas varies in intensity according to the color content in the original scene. Thus, the strips within each area form an analog of a phase and amplitude-modulated color carrier signal.

In a preferred embodiment of apparatus for carrying out the invention, a special camera may be provided with a banded color filter carrying primary color filter bands which are imaged onto the image plane of the photographic medium by an array of elongated lenticular lenses. The first series of elongated image areas forming the pilot carrier record may be formed by imaging onto each lenticule of the lens array an image of an area illuminated by the average light in the scene being photographed or by an independent light source. Therefore, a series of parallel lines representing a record of the pilot carrier will be formed in superimposed relation to the color carrier record irrespective of the presence or absence of light in portions of the original scene.

For a better understanding of the invention, together with the objects, advantages and further aspects thereof, reference may be made to the following detailed description, in conjunction with the drawings, in which:

BRIEF DESCRIPTION OF THE DRAWINGS

FIG. 1 is a plan view of a representative film produced in accordance with the invention;

FIG. 2 is a schematic side elevation in cross section of a photographic camera in accordance with the invention;

FIG. 3 is a front elevation of a portion of the camera of FIG. 2, showing the location of the banded color filter;

FIG. 4 is a plan view of the banded color filter shown in FIG. 3, illustrating its relationship to the lens and iris assembly of the FIG. 2 camera;

FIG. 5 is a schematic depiction of a hypothetical color image useful in explaining the invention;

FIG. 6 is a diagrammatic representation of a photographic image produced by the FIG. 2 camera from the hypothetical image of FIG. 5;

FIG. 7 is a series of graphs helpful in explaining the interrelationship of the various elements of the image of FIG. 6;

DETAILED DESCRIPTION OF THE INVENTION

Figure 8:
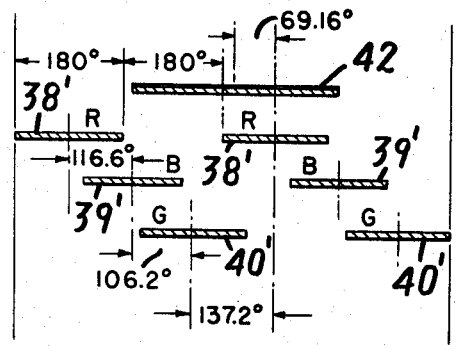
FIG. 8 is an exploded schematic side elevation in cross section of the elements of a banded filter of the type shown in FIG. 4, indicating the positional relationship between the filter elements.

FIG. 1 illustrates a preferred format of a monochrome film containing a record of color picture information which may be reproduced by television-scanning techniques. This film is described in detail in copending U.S. Pat. application Ser. No. 519,106 mentioned above. The film comprises a conventional transparent cinematographic strip 10, which may have sprocket hole perforations 12, and contains adjacent frames or frame areas 13, 14. Recorded in each frame 13 is a monochrome image of the luminance content in the original color picture scene, whereas the frames 14 contain an encoded monochrome representation of the color content of the scene. Specifically, each color frame 14 contains a first record of a color carrier modulated in amplitude and phase in accordance with color saturation and hue, respectively, in the original scene, and is superimposed on a second record of a pilot carrier, preferably at a frequency of one-half the color carrier frequency.

The color carrier is formed by a series of elongated, essentially parallel image areas, or image lines, having a constant nominal spatial periodicity, i.e., the number of lines repeated per unit distance normal to the lines. Each of the color image areas is comprised of elemental portions of which the transverse position (normal to the direction of elongation) varies in accordance with the color content of the original scene. This, it will be recognized, is similar to the record which would have been recorded using a scanning beam modulated in phase in accordance with the color content. When the color content of transversely adjacent elemental portions of the original scene changes from one hue to another, the phase of the carrier is shifted accordingly, as in an NTSC chrominance signal. In FIG. 1, the pilot and color carrier lines, shown only diagrammatically, are designated by the numeral 16.

FIG. 2 depicts an optical camera for recording the luminance and color frames 13, and 14 on the photographic medium, or film 10. For purpose of explanation, it may be assumed that the film 10 is supported and advanced through the camera in a conventional manner, and that the camera may be of the still or motion picture type. Therefore, only those portions of the camera pertinent to the discussion are illustrated.

The film 10 is maintained in close contact with a pair of adjacent frame image areas, or gates 18, 20, by a pressure plate 22 of conventional design. The incoming image is directed through an adjustable slit iris comprised of a pair of rotatable blades 24, which can be varied to widen or narrow the dimension of the slit through which light is received. Immediately below the iris blades 24 is a lens 25 (or lens system) which passes the incoming image to an inclined mirror filter 26 comprised of a series of banded filter elements, which convert the incoming image into a series of elongated parallel image areas each containing adjacent strip images of a selected color component in the original scene.

From the banded color filter 26 the converted image passes into a chrominance image chamber 28 formed between the structural walls 29, 30 of the camera. There, the converted image passes through a glass prism 31 and strikes a mirrored surface 32, which projects the image toward the image plane of the film 10. The end of the prism is formed as a lens 34 comprised of an array of elongated lenticular elements. As best seen in the illustration of FIG. 6, each of the lenticular elements is essentially a plano-convex cylindrical lens 35 receiving an image of a portion of the original scene viewed by all of the dichroic elements in the filter 26 and focuses it on the image plane of the film 10. Preferably the filter 26 is located close to the plane of the lens 25 so that every part of the original scene passes through all elements of the filter, and is projected by the mirror surface 32 onto a corresponding lenticule of the lens 34. Each such narrow part of the original scene image is therefore divided by the filter 26 into several adjacent strip images of different colors and focused on the film.

A portion of the light in the image entering the slot between the iris blades 24 and passing through the lens 25 passes through the dichroic elements of the filter 26 into a luminance image chamber 33 formed between the interior wall 29 and the wall 36 of the apparatus. A portion of any white light in the scene is reflected, as previously explained, to the mirror 32 by the dichroic filter elements, the remaining portion being transmitted through the film gate area 18 to the image plane of the film where a latent image of the luminance component of the scene is formed. It will be noted that inasmuch as certain of the color components in the scene image are reflected by the dichroic elements of the filter, the intensity of the luminance image will be reduced but, nevertheless, satisfactory. It is understood, of course, that additional optical elements, such as a lens or prisms, would be ordinarily required to lengthen or shorten one of the effective optical paths between the lens 25 and the plane of the film 10 in order that the latent images formed on the film beneath the gates 18, 20 are both properly focused. For example, the prism 31 may be effective for this purpose.

FIGS. 3 and 4 illustrate in more detail the arrangement of the dichroic elements on the filter 26. The filter 26 comprises two series of adjacent dichroic mirrors, each series including a red-reflecting mirror 38, a blue-reflecting mirror 39 and a green-reflecting mirror 40. The dichroic elements 38—40 of the filter 26 form the series of elongated image areas on the lenticular lens 34, each area of which contains adjacent red, blue and green image strips resulting from the reflection of colored light in the original scene from the individual dichroic mirrors 38—40. Of course, where there is an absence of a particular color component in the original scene, no corresponding image will be formed by the dichroic filter elements. The spacings between the centers of the dichroic mirrors 38—40 represent the transverse spatial displacement of the cycles of a carrier signal modulated in phase by chrominance information in the original scene if the carrier were recorded by a transversely scanning modulated recording beam.

When forming the luminance image in the frame image area 13 below the gate 18, not all of the white light components are transmitted by the various dichroic mirrors, as already mentioned. Since, however, white light (luminance) contains one of each of the primary colors red, blue and green, each dichroic mirror will transmit the two primary colors not reflected by the mirror. Thus, for example, the red mirror transmits blue and green (cyan), the blue dichroic mirror transmits green and red (yellow), whereas the green mirror 40 transmits red and blue (magenta). As a result, the latent image of the luminance component of the original scene on the film 10 will have a reduced intensity, but a generally true luminance image will be presented.

In this connection, the combination of film response and filter transmission should be chosen to approximate the luminance (Y) and color component characteristics used in the color television system. In the NTSC system, the combination of filter and film responses should produce color carrier amplitudes in the chrominance frame of the film or 59 percent, 63 percent and 45 percent for a color saturation of 75 percent of green, red and blue, respectively. In addition, since light transmissivity in the optical paths between the original scene and the luminance and chrominance frames can be different, the photosensitive emulsion of the film can be provided with correspondingly different ASA or DIN ratings, or with different spectral responses, to compensate for any discrepancies.

For producing images of the pilot carrier lines superimposed on the series color carrier lines, an opaque mask 42 having light reflective areas 44, of which the transverse dimension is one-half the total transverse dimension of the filter 26, is located in the filter plane. The light-reflective areas 44 may be comprised of, for example, a light-diffusing, opaque white paint or alluminized ground glass so that light, or luminance, from the whole scene viewed by the camera is averaged. Since light reflected from the areas 44 is diffuse, only certain of the light rays, namely, those connecting the individual lenticules 35 and the areas 44 will be seen by the lenticular lens 34. Moreover, the image of the areas 44 seen by the lens 34 will appear as a continuous white bar in superimposed relation to the images of the color filter 26 because of the diffuseness of the light in a direction parallel to the lenticules 35 of the lens. When recorded, the images of the reflective areas 44 form a series of spaced parallel areas or lines representing the pilot or reference carrier used in decoding the phase modulated color carrier.

It is important to recognize that the pilot or reference carrier lines must be present throughout each chrominance frame 14 of the film in order to have present a reference carrier when the film is reproduced by scanning. The reference carrier maintains synchronism of the demodulating circuits of the reproducing apparatus with the reproduced phase-modulated color carrier. Since the reflective areas 44 on the mask 42 do not form an image of the original scene, but rather are illuminated by the average light content of the scene, no image of the scene is formed by the areas 44 for projection onto the lenticular lens 34. For this reason, totally black areas in the scene, or areas lacking a red, green or blue color component, will not result in a corresponding absence mispositioning, or broadening of the reference carrier lines, as would happen if a mask were in a common optical path with the color filter. Thus, by placing the image-forming reflective areas 44 in a different optical path between the original scene and the image plane of the film, the reference carrier lines are unaffected by the color or luminance content of portions of the original scene.

FIG. 6 represents diagrammatically the monochrome image formed in the chrominance frame of the film when viewing the hypothetical scene depicted in FIG. 5. For purpose of explanation, the scene is assumed to consist of adjacent horizontal red, blue and green stripes. When this scene is projected onto the banded color filter 26, the red stripe is reflected to the mirrored surface 32 by only the red dichroic mirrors 38, the blue stripe by only the blue dichroic mirrors 39, and the green stripe by only the green dichroic mirrors 40. In FIG. 6, the monochrome image representing the red stripe is a series of transversely spaced elements 46, whereas the blue stripe is represented by a similar series of elements 48 displaced from the elements 46 and the green stripe image results in a series of elements 50 displaced from the elements 46 and 48. Superimposed on the monochrome representation of the color scene are the lines 52, constituting a record of the reference carrier formed by the reflective areas 44 of the mask 42.

FIG. 7 shows the idealized electrical signals which would be developed by transversely scanning the monochrome images of FIG. 6. Graph $a$ indicates that the pilot carrier will be a symmetrical square wave signal having maximum and minimum levels of equal duration. This characteristic of the resulting electrical pilot signal is desirable because it minimizes the even harmonic, which would interfere with the color carrier frequency $f_0$. The fundamental component of the pilot carrier at a frequency $f_p = \frac{1}{2}f_0$ is shown by the broken line in graph $a$. Graphs $b$, $c$ and $d$ illustrate the idealized electrical signals that would result from transverse scanning of the elements 46, 48 and 50, respectively representing the red, blue and green portions of the scene. The fundamental components of the frequency $f_0$ of the square wave electrical signals is depicted by the sine wave shown in broken lines and superimposed on the square wave signals.

From a comparison of the relative phases of the carrier fundamentally derived from scanning the red, blue and green monochrome images, it can be seen that the phase of the color carrier for a red color component leads the phase of the carrier representing a blue color component. Similarly, the phase of the color carrier for the blue color component, leads the phase of the color carrier signal for a green color component. At the same time, the phases of the color carrier signal for the various primary color components bear a fixed relation to the phase of the pilot carrier, which is at one-half the frequency of the color carrier.

Figure 8A:
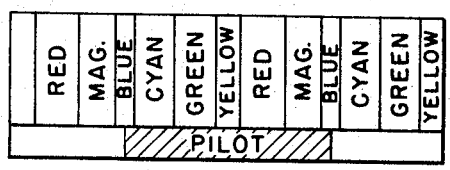
FIG. 8A is a diagrammatic representation of the positional relationship of the monochrome images formed on photographic film by the filter elements of FIG. 8 for various color components.

FIG. 8 shows an alternate arrangement of the dichroic mirror elements comprising the filter 26, in which the individual dichroic mirrors 38' —40' are in overlapping, rather than abutting, relationship. Each of the mirrors has a width equal to one-half the center-to-center spacing between adjacent mirrors for the same color, and this width represents 180 electrical degrees of the color carrier signal. The center-to-center spacing between adjacent red and blue mirrors 38', 39' is 116.6°, between the blue and green dichroic mirrors 39'40' it is 106.2° and between the green and red mirrors 40', 38' it is 137.2°. The center of the red filter 38' is displaced from the center of the surface 42 forming images of the reference carrier lines by 69.16°. The diagram of FIG. 8A illustrates the positions of maximum intensity of the monochrome color carrier record for various color components in an original scene image passing through the dichroic mirrors 38' —40'. The specific electrical angles given above are compatible with the color phases of an NTSC color signal. However, other positional relationships among the dichroic mirrors, or other filter elements, is possible and the above values are given as example only.

The transverse dimension of a practical film may be about .30 inches, in which case each of the frames 13, 14 has a nominal transverse dimension of about .14 inches. Assuming that the transverse dimension of the frames 13, 14 is .143 inches the center-to-center spacing between adjacent dichroic mirrors might range between about .0215 inches and .0275 inches. The transverse dimension of the reflective or light transmitting surfaces 44 of the mask 42 in such case would be about .0715 inches. Again, the above values are merely representative and, of course, depend upon the particular optical system used in the camera.

Figure 9:
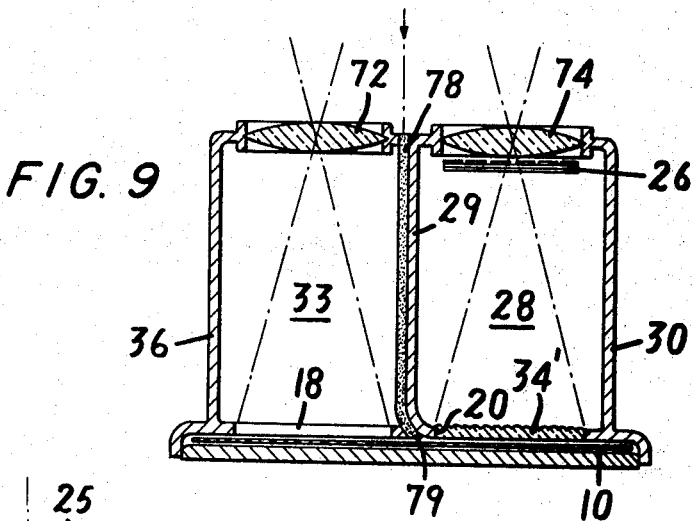
FIGS. 9 and 10 are schematic side elevations in cross section of alternate constructions of the FIG. 2 camera.

FIG. 9 shows an alternate embodiment of the FIG. 2 camera, in which the color filter 26 is disposed immediately adjacent the lens 25. In this case, a half-silvered mirror 60 at an angle of 45° to the plane of the filter 26 receives the converted image and reflects it to the prism 31 and mirrored surface 32 for projection onto the lenticular lens 34'. The lens 34' in this case is in the form of a lenticular lens plate. The luminance component of the original scene, as before, passes through the lens 25, and color filter 26, and from there, to the film gate 18 for exposing the frame 13. In this connection, it should be noted that the chrominance frame 14 also contains a luminance image in superimposed relation to the pilot and color carriers. However, inasmuch as the luminance signal is restricted to a bandwidth separate from the bandwidth of the color carrier sidebands, the resulting luminance signal derived from scanning the chrominance frame 14 can be removed from the composite color signal by conventional filtering.

For forming the series of elongated images representing the pilot carrier in the apparatus of FIG. 8, a source of illumination 62 is mounted in a small chamber 64 adjacent the wall 36 of the luminance chamber 33. The source 62 is energized in synchronism with the shutter (not shown) by a shutter switch 66 that closes momentarily to connect a current source, such as the battery 67, to the light source 62 each time a frame is exposed. This results in a momentary flashing of the light 62. Illumination then passes through a suitable lens 68 and slotted mask 70 of ground glass, for example, to the mirrored surface 32, where an image of the mask is formed for projection onto the lenticular lens 34'.

Figure 10:
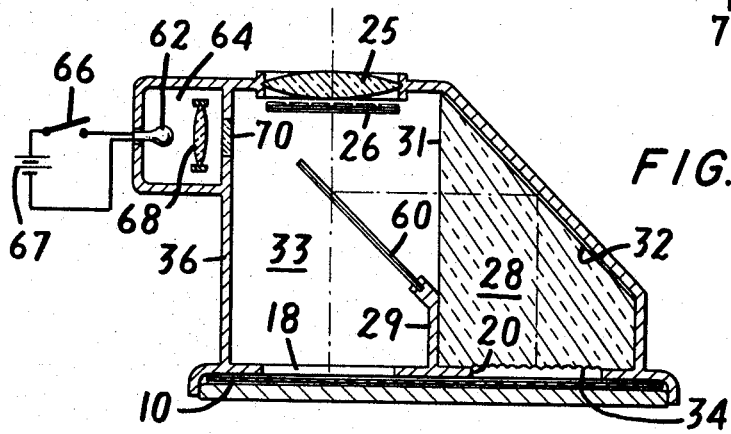

In FIG. 10, showing a further alternative embodiment of the camera, two separate lenses 72, 74 are used to image the luminance and chrominance components in the scene onto the frame areas 13 and 14, respectively. As in the FIG. 8 embodiment, the color filter 26 is disposed very close to and immediately behind the lens 74 in the chrominance image chamber 28. The advantage of the FIG. 9 embodiment is that the luminance image passes directly to the image plane of the film 10 without alternation by the color filter 26.

Synchronization marks (FIG. 1) can also be recorded on the film 10 during exposure of the frames 13, 14. The synchronizing marks can be sensed during reproduction to develop a signal to maintain the film motion and vertical scanning rate in synchronism. To this end, the camera can be provided with a flexible light-transmissive tube 78 that accepts light from the scene when the camera shutter opens and transmits it to the plane of the film 10. The end 79 of the light-transmitting tube is located immediately above the photosensitive side of the film at a location to place the synchronizing mark 76 in a preselected position with respect to each pair of frames.

Although the invention has been described with reference to specific embodiments and methods, certain modifications and variations will occur to those skilled in the art. Thus, alternate approaches for optically recording color information in the format described are available. It is possible to obtain identical results in using, for example, the camera of FIG. 9 in combination with a film of which the portion passing underneath the chrominance film gate 20 includes an integrally embedded, banded color filter. In such case the lens 34 and filter 26 are not used and the film itself may be lenticulated to have below each lenticule a series of color filters arranged in the manner shown in FIGS. 3 and 4. A latent image of the pilot carrier can be prerecorded on the film, or in the alternative, one of the masks described can be implemented to form an image of the pilot carrier lines. Also, it is possible to employ a film having sprocket holes in the intermediate strip between the frames 13, 14, if desired.

Accordingly, all such modifications and variations are intended to be included within the scope of appended claims.

I claim:

1. In a method for recording color picture information from an original scene on a monochrome photographic medium in a coded format, the steps of:

exposing a frame area of the medium with an optical image of a first series of mutually spaced elongated areas of illumination to form in the frame area a record of a like first series of continuous parallel contrasting lines irrespective of variations in the luminance content between portions of the original scene, the first series having a constant spatial periodicity;

converting an image of the original scene into a second series of parallel elongated image areas corresponding to elongated image areas in the original scene having a spatial periodicity different from said constant periodicity of the first series, the areas of the second series being comprised of at least two strips having adjacent portions providing displaced images of different color components in the corresponding area of the scene; and exposing the frame area of the medium to said second series of images to record them in superimposed parallel relation to the recorded lines of the first series.

2. A method as defined in claim 1, in which the dimension of the adjacent portions of the strips, normal to the parallel direction, are unequal.

3. A method as set forth in claim 1, in which the strip images comprising the second series of elongated areas are in overlapping relationship.

4. A method as set forth in claim 1, in which the transverse dimensions of the elongated areas of illumination of the first image series are substantially equal.

5. A method as defined in claim 1, in which the first and second series of areas are recorded simultaneously.

6. A method as defined in claim 1, in which the first and second series of areas are recorded sequentially.

7. A method according to claim 6, in which the photographic medium includes an arrangement of color filter areas by which the original scene image is converted into the second series of elongated image areas.

8. A method according to claim 7, in which the first series of elongated areas is recorded on the photographic medium prior to exposure to the second series of elongated images.

9. A method according to claim 1, in which the strips of the elongated areas of the second series representing respective single color components are repeated at least once in mutually spaced transverse relation to form respective second strip images within each area of a portion of the corresponding area of the original scene.

10. A method as defined in claim 1, in which the transverse dimension of the elongated areas of illumination of the first series is about one-half the corresponding dimension of the areas of the second series.

11. Apparatus for optically recording color picture information from an original scene on a monochrome photographic medium in a coded format, comprising:

optical means for directing to a frame area of the medium an optical image of a first series of spaced elongated areas of illumination to form in the frame area a record of a like series of continuous, parallel contrasting lines irrespective of variations in the luminance contrast between portions of the original scene, said lines having a constant transverse spatial periodicity;

color selective means disposed to receive an image of the original scene for converting such image into a second series of elongated image areas corresponding to elongated areas of the original scene and having a spatial periodicity different from said constant periodicity of the first series; the areas of the second series being comprised of a plurality of image strips having adjacent portions providing displaced images of different color components in the corresponding area of the scene; and lens means for focusing the image areas of the second series onto the frame area of the medium in superimposed parallel relation to the exposing image of the first series of areas.

12. Apparatus in accordance with claim 11, in which the color selective means comprises at least two repeating patterns each comprised of at least three color filter bands responsive to different color components and having adjacent portions for transmitting to the lens means two series of strip images of which the strips in each series represent a full complement of primary colors.

13. Apparatus according to claim 11, in which the color selective means comprises at least two color filter bands having adjacent portions having separate color-selective qualities for transmitting to the lens means adjacent strip images of the different color components in the original scene.

14. Apparatus as set forth in claim 13, in which the color filter bands are in overlapping relationship.

15. Apparatus according to claim 13, in which the transverse dimensions of adjacent portions of the color filter bands are unequal.

16. Apparatus according to claim 11, in which the optical means includes:

means for averaging the luminance content of the original scene; and image-forming means receiving the averaged luminance content and forming therefrom the elongated areas of illumination of the first series.

17. Apparatus according to claim 16, in which the luminance-averaging means and color-selective means are in separate optical paths between the original scene and photographic medium.

18. Apparatus according to claim 17, in which the luminance-averaging means comprises a surface disposed to receive and diffusely reflect to the frame areas illuminations from the original scene.

19. Apparatus as defined in claim 11, in which the optical means is effective to provide elongated illuminated areas having a transverse dimension of about one-half the corresponding dimension of the areas of the second series.

20. Apparatus as defined in claim 11, in which the areas of illumination of the first series directed to the frame area by the optical means have transverse dimensions which are equal.

21. Apparatus according to claim 11, in which the lens means comprises a parallel lenticular array of plano-convex cylindrical lenses, each focusing an area of the second series onto the frame area of the medium.

22. Apparatus according to claim 21, in which each lens of the lenticular array also focuses a pair of areas of illumination of the first series onto the frame area of the medium.

23. In combination with apparatus according to claim 11, a photographic medium in which the color-selective means is contained on the photosensitive surface of the medium.

24. The combination of claim 23, in which the lens means forms an integral part of the film and is superimposed on the color selective means of the film.

25. Apparatus as defined in claim 11, in which the optical means includes:

an independent source of illumination; and image-forming means receiving illumination from the independent source for presenting to the frame area an image of at least two relatively contrasting, elongated image areas of illumination.

26. Apparatus according to claim 11, further comprising means for directing to an adjacent frame area of the photographic medium a pictorial luminance image of the original scene.

27. Apparatus according to claim 26, in which the color-selective means comprises at least two adjacent dichroicminor elements disposed to reflect displaced images of different color components on the original scene to the frame area of the medium and to transmit non-reflected components of the original scene image to the adjacent frame area of the medium.

28. Apparatus according to claim 11, in which the apparatus includes means forming a first, luminance image chamber and a second, chrominance image chamber, the image of the first series of areas being received in the first chamber and the image of the second series of areas being received in the second chamber.

29. Apparatus as defined in claim 28, in which:
the original scene image is received through a common lens; and
one of the first and second image chambers includes means for altering the effective length of the optical path between the common lens and the image plane of the photographic medium.

30. Apparatus as defined in claim 30, in which:
the optical path altering means comprises a light-transmitting prism disposed in the second chamber; and
the lens means is formed integrally with the prism adjacent the image plane of the medium.

Page 1

PO-1050
(5/69)

UNITED STATES PATENT OFFICE
CERTIFICATE OF CORRECTION

Patent No. 3,535,992      Dated October 27, 1970

Inventor(s) Peter C. Goldmark and William E. Glenn, Jr.

It is certified that error appears in the above-identified patent and that said Letters Patent are hereby corrected as shown below:

Substitute the following drawing for Figure 6:

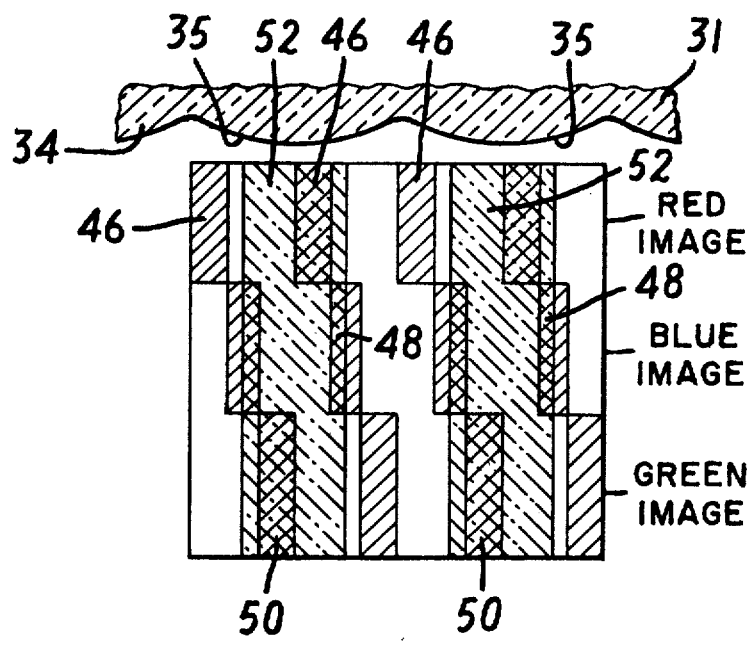

FIG. 6

UNITED STATES PATENT OFFICE
CERTIFICATE OF CORRECTION

Patent No. 3,535,992    Dated October 27, 1970

Inventor(s) Peter C. Goldmark and William E. Glenn, Jr.

It is certified that error appears in the above-identified patent and that said Letters Patent are hereby corrected as shown below:

In column 6, line 14, change "FIG. 9" to --FIG. 10--; line 33, change "FIG. 8" to --FIG. 10--; line 44, change "FIG. 10" to --FIG. 9--; and line 47, change "FIG. 8" to --FIG. 10--.

On the cover page, first column, item "72", line 2, change "William E., Jr. Glenn" to --William E. Glenn, Jr.--.

In column 4, line 37, change "or" to --of--.

In column 5, line 65, insert --,-- after "39'".

In column 6, line 52, change "alternation" to --alteration--.

In column 7, line 9, change "I claim:" to --We claim:--.

In column 9, line 2 (claim 27), change "dichroicminor" to --dichroic mirror--.

SIGNED AND SEALED
MAR 9 1971

(SEAL)
Attest:

Edward M. Fletcher, Jr.
Attesting Officer

WILLIAM E. SCHUYLER, JR.
Commissioner of Patents